United States Patent [19]

McDonald

[11] 3,989,100
[45] Nov. 2, 1976

[54] INDUSTRIAL TECHNIQUE
[75] Inventor: Bertrand Norval McDonald, Lynchburg, Va.
[73] Assignee: The Babcock & Wilcox Company, New York, N.Y.
[22] Filed: May 19, 1975
[21] Appl. No.: 578,963

[52] U.S. Cl. .................................. 165/81; 176/87
[51] Int. Cl.² .............................................. F28F 9/12
[58] Field of Search .......................... 165/156–162, 165/81, 82, 3; 122/32, 34, 365, 510; 176/65, 87

[56] References Cited
UNITED STATES PATENTS

| | | |
|---|---|---|
| 3,106,957 | 10/1963 | Cannon ................................. 176/65 |
| 3,121,046 | 2/1964 | Trickett et al. ......................... 176/65 |
| 3,753,853 | 8/1973 | Schubert ................................ 176/87 |

Primary Examiner—Charles J. Myhre
Assistant Examiner—Theophil W. Streule, Jr.
Attorney, Agent, or Firm—J. M. Maguire; J. P. Sinnott

[57] ABSTRACT

An illustrative embodiment of the invention has a feedwater inlet conduit disposed withn a steam discharge nozzle for use in a power reactor system. Typically, the conduit and nozzle combination penetrate the wall of a reactor pressure vessel and support a heat exchanger within the pressure vessel structure.

2 Claims, 2 Drawing Figures

INDUSTRIAL TECHNIQUE

BACKGROUND OF THE INVENTION

1. FIELD OF THE INVENTION

This invention relates to pressure vessel penetrations and, more particularly, to feedwater inlet conduit and steam discharge nozzle apparatus for nuclear reactor systems, and the like.

2. DESCRIPTION OF THE PRIOR ART

Some designs for nuclear power reactor systems have a reactor core that is disposed within a pressure vessel. The reactor core generates heat that is removed by means of a primary coolant which flows through passageways or channels in the core. This primary coolant is then pumped from the reactor core passageways to one or more heat exchangers that are disposed within the pressure vessel. Within the heat exchangers, the heat that the primary coolant absorbed when in the reactor core is transferred to a secondary coolant.

Water is the usual secondary coolant substance, and within the heat exchangers, the water is heated until it vaporizes and forms steam. The steam from the heat exchanger flows out of the pressure vessel through a discharge nozzle to one or more steam turbines for power generation, or the like. The spent steam from the turbines then flows through a condenser which converts the vapor back into liquid water. This water—or feedwater—is reintroduced into the heat exchangers through a feedwater inlet conduit that penetrates the pressure vessel wall. Preferably, these heat exchangers have an array of generally parallel tubes that contain the primary coolant. The feedwater for the secondary coolant cycle is permitted to flow in the spaces between the tubes in order to absorb the heat from the primary coolant fluid that is flowing within these tubes.

Although the foregoing structural arrangement provides a relatively economical and efficient nuclear power system, there are a number of design difficulties. For example, the feedwater inlet conduit and the steam discharge nozzle each require separate pressure vessel penetrations. This specific need involves a great deal of expensive high-quality special machining, welding and weld joint testing. The weld joint testing, moreover, must be conducted not only during manufacture, but also at regular inspection intervals during the service life of the reactor. Further in this regard, the pressure vessel penetrations that are needed to accommodate all of these conduits and nozzles tend to weaken the pressure vessel structure and produce undesirable areas of local stress concentration.

With respect to local stress concentrations, it also should be noted that during reactor operation the relatively thick steel walls of the pressure vessel tend to reach an equilibrium temperature that approaches the temperature of the steam in the secondary coolant loop. The feedwater in the secondary coolant loop, however, that flows into the heat exchanger through the inlet conduit, is relativey cold. This temperature difference leads to stresses in the relatively thick steel walls of the pressure vessel that, if unchecked, can be extremely destructive. To overcome this problem it has been customary to insert thermal insulation between the feedwater inlet conduit and the circumscribing portion of the pressure vessel. This technique, although generally adequate, tends to increase costs by reason of the special machining, welds, fittings and inspections that are required.

Because of the expansion and contraction that metals undergo in response to temperature changes, these prior penetration designs also tend to produce troublesome differential thermal movements, the relatively hot pressure vessel, for example, expanding through a greater distance than the colder associated feedwater inlet conduit.

As hereinbefore described, some of these designs have a number of modular heat exchangers mounted within the pressure vessel. Naturally, these modules must be secured within the pressure vessel in a manner that is capable of sustaining the anticipated stresses to which each of the modules will be subjected. In view of the thermally induced expansion and contraction, shocks and stresses that could reasonably be expected during power reactor start-up, operating transients and shut-down conditions, in additon to the need to remove the modules for occasional service inspections and repair with remote handling equipment because of the radiation environment, the problem of a suitable module mounting is extremely difficult to solve. Typically, past attempts to solve this complicated support problem have involved the use of support lugs, a built-up metal ledge and bolted support plates, all within the pressure vessel. These structures, however, involve a need for costly, precise machining and tedious, carefully conducted assembly and disassembly procedures.

Consequently, the requirement to provide more effective and less expensive thermal effects protection for feedwater inlet conduits and to improve the support structure for heat exchanger modules within a reactor pressure vessel has remained unsatisified to a great extent.

SUMMARY OF THE INVENTION

The foregoing and a number of other difficulties that have characterized the prior art are largely overcome through the practice of the invention. More specifically, by nesting the feedwater inlet conduit within the steam discharge nozzle, many of the thermally induced stress problems that have been associated with the prior art are overcome. Thus, not only is the thermal gradient between the feedwater inlet conduit and the surrounding pressure vessel mass reduced, but the entirely unexpected benefit of reducing by one half the number of feedwater inlet and steam discharge penetrations in the pressure vessel wall also is provided.

Further in accordance with the principles of the invention, the individual heat exchanger modules are supported from the pressure vessel at the same location as the nested feedwater inlet conduit and steam discharge nozzle combination. This feature of the invention eliminates the need to accommodate troublesome differential thermal expansion problems through special structures within the pressure vessel, and the like.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENTS

Figure 1:
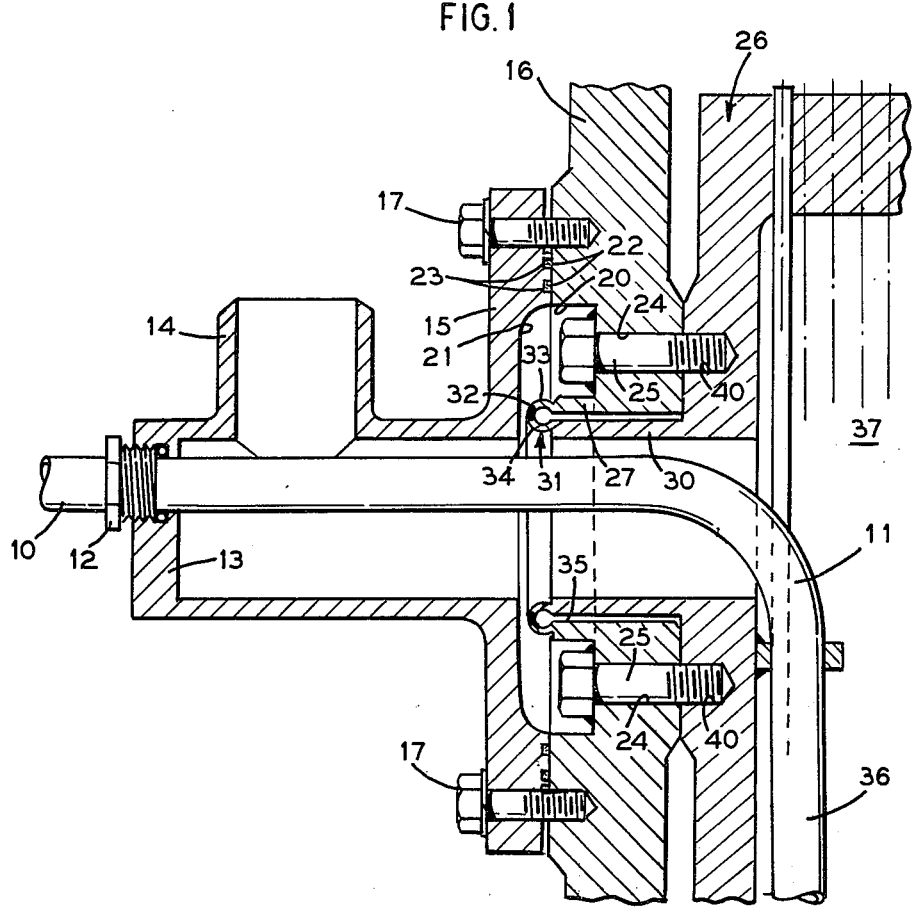
FIG. 1 is a front elevation in full section of a portion of a nuclear reactor system that embodies principles of the invention.

For a more complete appreciation of the invention, attention is invited to FIG. 1 of the drawing. Illustratively, a horizontally disposed feedwater inlet conduit 10 has a 90° bend 11 that directs the conduit 10 in a vertically downward direction. A water-tight packing gland 12 provides a seal at the vertical plane of penetration between the outer surface of a horizontal span of the inlet conduit 10 and a generally cylindrical portion of a steam discharge nozzle 13 that encloses part of the conduit 10 and the bend 11.

The nozzle 13 also has a vertically disposed cylindrical coupling 14 that permits steam to flow from the nozzle 13. The cylindrical portion of the nozzle 13, moreover, terminates in a flange 15 that is secured to the exterior surface of power reactor pressure vessel 16 by means of an array of bolts 17.

The exterior surface of the reactor pressure vessel 16 is provided with an annular recess 20 that is in alignment with an opposing annular recess 21 that is formed in the face of the flange 15 which engages the exterior surface of the pressure vessel 16. The flange recess 21 is formed adjacent to the terminal portion of the cylindrical section of the discharge nozzle 13. The contacting or pressure vessel engaging surface of the flange 15 has a pair of circular grooves 22 that are formed in the portion of the flange surface that is located between the recess 21 and the bolts 17. These grooves accommodate water seals 23 which assist in forming a water-tight connection between the flange 15 and the exterior surface of the pressure vessel 16.

The recess 20 that is formed in the exterior surface of the pressure vessel 16 has an array of bores 24 that are drilled through to the interior surface of the pressure vessel 16. Unthreaded shanks on bolts 25 are received within the bores 24 to support a heat exchanger module 26 as described subsequently in more complete detail. The annular recess 20 in the pressure vessel 16 has a hollow cylindrical wall 27 that protrudes toward the opposing recess 21 in the flange 15 and the cylindrical portion of the nozzle 13.

A hollow cylindrical collar 30 is received within and spaced from the cylindrical wall 27. The collar 30 and the wall 27 are joined together by means of a hollow, torus shaped seal 31. As shown, the seal 31 is formed by means of a welded seam 32 that joins together two opposing arcuately shaped members 33 and 34 that protrude from the extreme ends of the wall 27 and the collar 30, respectively. This seal is not only water tight, but also provides a degree of flexibility or resiliency that further tends to alleviate the stress problems that otherwise would be caused through differential thermal expansion and contraction.

The collar 30 protrudes through a transversely disposed aperture 35 that is formed in the pressure vessel 16 in order to provide a flow path for steam that rises within the heat exchanger module 26 and to permit the feedwater inlet conduit 10 to negotiate the bend 11 that enables a longitudinally downward length 36 of the conduit 10 to conduct incoming secondary coolant feedwater to discharge within the module volume that is external to a bank of heat exchanger tubes 37. The primary coolant, flowing under pressure from the reactor core (not shown in the drawing), passes through the tubes in the tube bank 37 in order to discharge the heat acquired during passage through the core to the secondary coolant.

As shown in FIG. 1, the heat exchanger module has tapped and threaded bores 40 that receive the threaded ends of the bolts 25. Thus, the bolts 25 penetrate the pressure vessel 16 and draw the heat exchanger module firmly against the inner surface of the pressure vessel in order to support the module, nozzle and inlet conduit all at essentially the same location, thereby essentially eliminating differential thermal expansion problems in addition to providing a relatively simple and uncomplicated structure for installing and removing the heat exchanger module.

Figure 2:
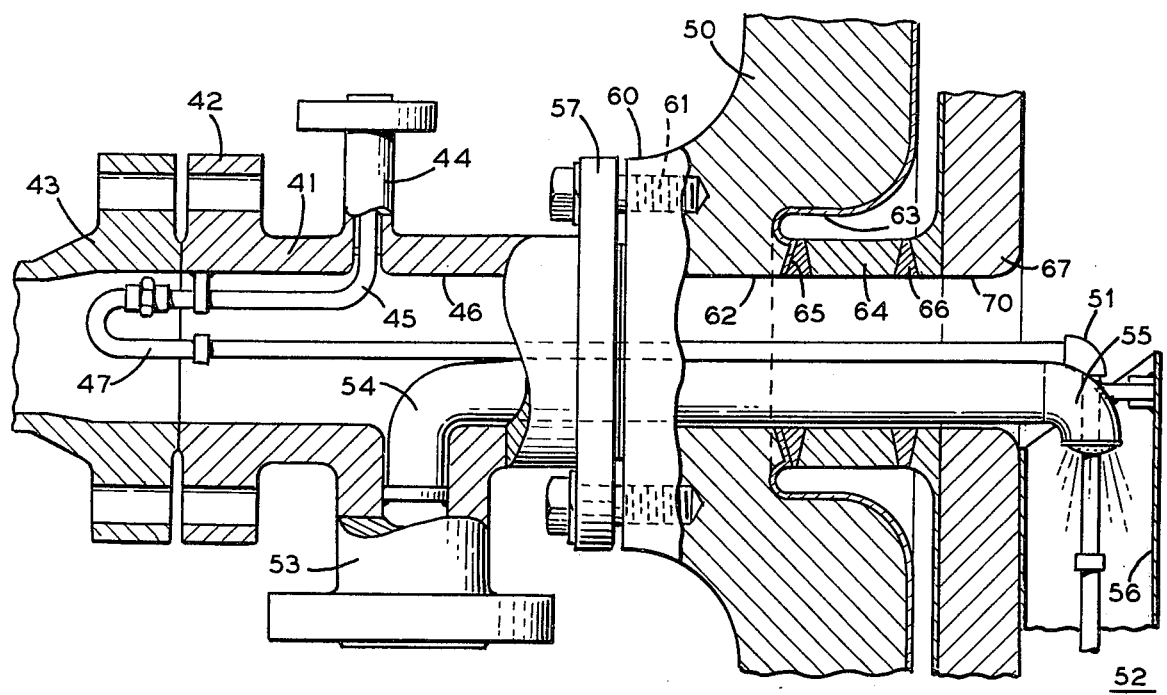
FIG. 2 is a front elevation in full section of another embodiment of the invention.

A further embodiment of the invention is shown in FIG. 2. More specifically, a horizontally disposed, generally cylindrical steam discharge nozzle 41 has a vertically oriented flange 42 that permits the nozzle 41 to be coupled in fluid communication with a main steam line feeder 43 for the power plant. The generally cylindrical shank of the steam discharge nozzle supports a vertical, flanged nipple 44. A drain and pressure function, which will be described subsequently, is provided by the nipple 44. In any event, the nipple 44 accommodates drain and pressure connection tubing 45 which extends downwardly in a vertical direction into a generally cylindrical passageway 46 that is formed within the nozzle 41 to permit steam flow toward the main steam line feeder 43. A 180° bend, or expansion loop 47 in the tubing 45 is positioned within the passageway 46 and extends in a horizontal direction through the nozzle 41 and through a reactor pressure vessel wall 50 to an elbow 51 that turns the tubing 45 downwardly within a heat exchanger 52.

The cylindrical shank on the steam discharge nozzle 41 also has a vertically oriented flanged feedwater inlet nipple 53 that enables feedwater to flow up and into a communicating and horizontally disposed portion of a feedwater conduit 54. The feedwater conduit 54 penetrates the reactor pressure vessel wall 50 and enters the heat exchanger 52 where the conduit 54 terminates in a downwardly oriented combination elbow and spray head 55.

The spray head 55 has an array of perforations that permit the feedwater in the conduit to discharge into a vertically disposed cylindrical downcomer 56 within the heat exchanger 52. It also should be noted in this respect that the drain and pressure connection tube 45 also extends downwardly into the heat exchanger 52 by way of the downcomer 56. The drain and pressure connection tube permits the secondary coolant to be drained from the heat exchanger 52. Typically, after the reactor (not shown in the drawing) has been shut down and allowed to cool, gas is introduced under pressure to the interior of the heat exchanger 52 through a pressurization line (also not shown in the drawing). With a sufficiently great gas pressure, secondary feedwater in the bottom of the heat exchanger is expelled from the heat exchanger by being forced upwardly and out through the drain and pressure connecton tube 45.

The generally cylindrical portion of the steam discharge nozzle 41 terminates in a vertically oriented flange 57 that is secured to a protruding and mating surface 60 by means of bolts 61, or other suitable fastening means. As shown in FIG. 2, the steam passageway 46 in the discharge nozzle 41 is in aligned fluid communication with a bore 62 that is formed in the reactor pressure vessel wall 50. The bore 62 is, in effect, a continuation of the steam discharge nozzle through the reactor structure.

Within the reactor pressure vessel wall 50 an annular recess 63 is formed to accommodate a horizontally arranged cylindrical coupling 64 that is joined to a prepared surface 65 by means of a weld. Illustratively, the coupling 64 is in horizontal alignment and fluid communication with the bore 62 in the pressure vessel wall 50 and the steam passageway 46 in the discharge nozzle 41.

The vertical end of the coupling 64 that is disposed away from the inner surface of the pressure vessel wall 50 is joined through a weld to a prepared surface 66 on a shell 67 for the heat exchanger 52. A bore 70, also is in alignment and fluid communication with the steam passageway 46 in the discharge nozzle 41.

In operation secondary coolant feedwater enters the nozzle through the feedwater inlet nipple 53 in order to flow through the conduit 54 and the spray head 55 to discharge within the downcomer 56. This feature of the invention, leading the feedwater into the heat exchanger 52 through a conduit 54 has a number of important advantages. Typically, this construction eliminates the need for a shroud around the tube bundle to protect the structure from thermal shock that might be caused when cold feedwater contacts higher temperature portions of the heat exchanger. Shroud elimination leads to further important, albeit subtle advantages. For example, the heat exchanger volume that ordinarily is occupied by the shroud now can be made available for additional heat exchanger tubing, thereby increasing engineering efficiency and reducing system costs.

The technique for mounting the heat exchanger 52 within the pressure vessel wall 50 by means of the welded connection to the coupling 64 as a part of the steam discharge nozzle 41 also provides important benefits through the elimination of the stresses that ordinarily are associated with structures of this character. Thus, the entire heat exchanger and nozzle array moves as a single unit in response to thermal expansions and contractions.

Continuing with the description of the operation, the secondary coolant feedwater extracts heat from the primary coolant that flows through the tubes in the heat exchanger tube bundle (not shown in FIG. 2). As a result, the feedwater rises into steam that flows out of the heat exchanger 52 by way of the passageway 46 in the nozzle 41.

There are, of course, any number of modifications that can be applied to the illustrative embodiments of the invention that are shown in FIGS. 1 and 2. Typically, the flange 42 in FIG. 2 can be replaced by a "Grayloc" connector of the type that is described in more complete detail in the available "Grayloc" technical literature. A ledge, or other support, moreover, also might be provided on the inner surface of the reactor pressure vessel wall 50 to steady, or to further stabilize the heat exchanger 52.

The embodiments of the invention in which an exclusive property or privilege is claimed are defined as follows:

I claim:

1. A combination discharge nozzle and inlet conduit for supporting a heat exchanger within a nuclear reactor pressure vessel comprising, a generally cylindrical portion on the disccharge nozzle, said cylindrical portion having a passageway formed therein, a flange on one end of said cylindrical portion, said flange generally circumscribing said passageway and having means for attaching the discharge nozzle to the reactor pressure vessel in fluid-tight relation, said cylindrical portion having an aperture formed therein to accommodate the inlet conduit within said passageway to enable the inlet conduit to protrude into the heat exchanger, a collar formed on the heat exchanger that protrudes from the heat exchanger toward said cylindrical nozzle portion to establish fluid communication with said passageway therein, means joining said collar to the heat exchanger for expansion and contraction therewith in fluid-tight relation, and means associated with said collar for supporting the heat exchanger within the nuclear reactor pressure vessel.

2. A combination discharge nozzle and inlet conduit according to claim 1 wherein said cylindrical portion aperture to accommodate the inlet conduit further comprises a flanged nipple protruding from said cylindrical portion, the inlet conduit being in fluid communication with said flanged nipple and extending through said cylindrical portion passageway to the heat exchanger.

* * * * *